United States Patent [19]
Thoma

[11] Patent Number: 5,226,386
[45] Date of Patent: Jul. 13, 1993

[54] ABSORBENT URINE DETECTOR FOR TRAINING ANIMALS

[76] Inventor: Eugene L. Thoma, 526 Silver Lake Rd., New Brighton, Minn. 55112

[21] Appl. No.: 920,652

[22] Filed: Jul. 28, 1992

[51] Int. Cl.$^5$ ............................................. A01K 95/00
[52] U.S. Cl. ........................................ 119/95; 119/29
[58] Field of Search .................... 119/29, 143, 95; 54/79.1, 79.2

[56] References Cited

U.S. PATENT DOCUMENTS

| | | | |
|---|---|---|---|
| 3,603,290 | 9/1971 | O'Rork | 119/29 |
| 3,971,371 | 6/1976 | Bloom | 128/138 |
| 4,527,991 | 7/1985 | Msarsa | 119/95 X |
| 4,577,591 | 3/1986 | Wesseldine | 119/143 |
| 4,813,949 | 3/1989 | O'Rourke | 604/391 |
| 5,005,525 | 4/1991 | Stanton | 119/143 X |

Primary Examiner—Gene Mancene
Assistant Examiner—Thomas Price

[57] ABSTRACT

The training device of the present invention is worn by a dog or other small quadruped and sounds an audio alarm when the animal urinates. This device includes a flexible absorbent panel assembly, a saddle assembly, a back strap assembly, and a front strap. The absorbent panel assembly absorbs the urine discharged and contains embedded moisture sensing electrodes. This panel assembly is supported beneath the animal by the back strap assembly and the saddle assembly. The back strap assembly, passing over the animal's back, supports the rear end of the panel. The saddle assembly, passing over the animal's withers, support the forward end of the panel. The front strap prevents posterior movement of the saddle and panel assemblies. The saddle assembly contains electronics for detecting moisture in the panel assembly, a battery, and an audio alarm. The the panel assembly is releasable from the saddle assembly and is washable. Separate embodiments of this invention are suitable for training male and female animals.

15 Claims, 5 Drawing Sheets

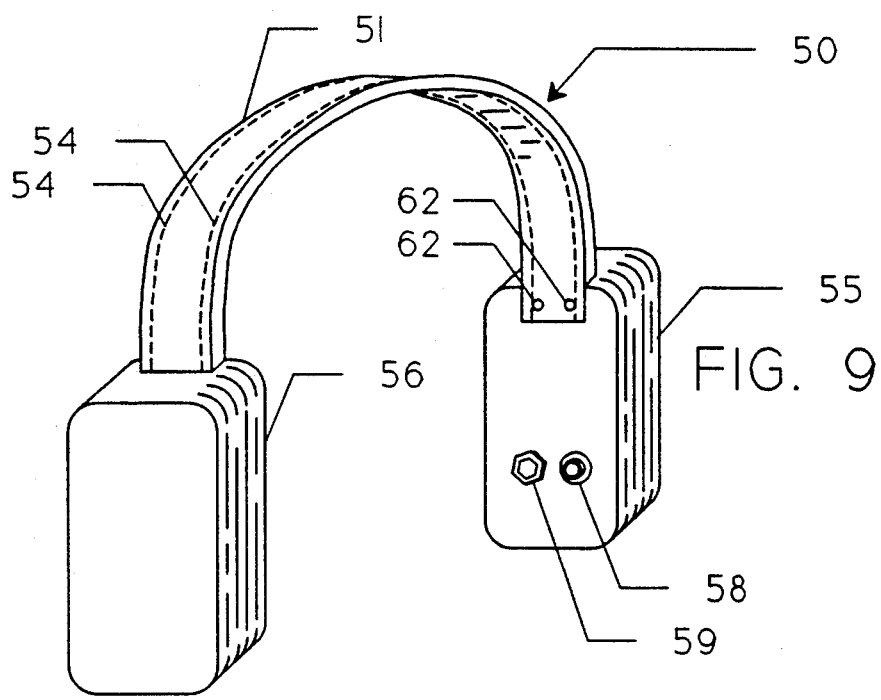
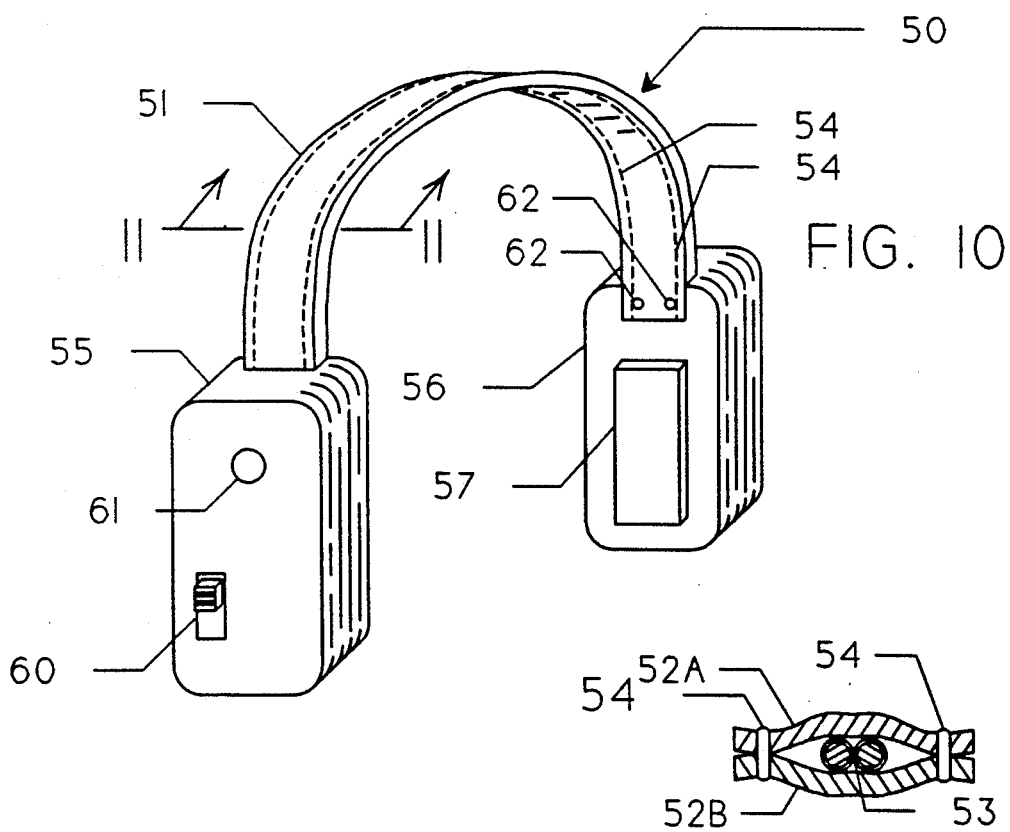

ABSORBENT URINE DETECTOR FOR TRAINING ANIMALS

BACKGROUND

1. Field of Invention

This invention relates to an absorbent urine detecting device for training dogs or other domesticated animals.

2. Description of Prior Art

Many people experience problems training young dogs to be housebroken. The training period is a trying time for both owners and the animals. To train an animal efficiently requires reinforcing the animal (negatively or positively) when the behavior is occurring. The longer the period between the behavior and the reinforcement, the more difficult it is for the animal to learn the desired behavior. To train an animal not to urinate inside a house, requires catching the animal in the act, negatively reinforcing it, and immediately taking it to an area where it may safely discharge. To catch the animal in the act of urinating is a time consuming process. The reward for failure at best is a mess to clean up and at worst ruined furniture or carpeting. The stains and lingering unpleasant odors are very difficult to remove. An animal that finds it can successfully discharge in an unacceptable area, even occasionally, becomes more difficult to train. They learn to avoid urinating around people but sneak off by themselves to urinate wherever they please. One can only guess how many thousands of yards of carpeting are disposed of in landfills because of this problem. This device has helped correct this type of behavior.

Many previous devices have been designed to attempt to prevent damage from animals that are not properly housebroken. U.S. Pat. No. 5,005,525 describes a control device with an absorbent pad for urine excreted by the animal wearing the device. U.S. Pat. No. 4,813,949 involves a diaper for a dog or other small quadruped. U.S. Pat. No. 4,527,991 describes a small animal protective garment for collecting body fluids. These and many other diaper like designs try to control the damage but do not offer any help in training the animal. The present invention not only prevents damage but sounds an alarm when urine is detected.

OBJECTS AND ADVANTAGES

Accordingly, several objects and advantages of my invention are:

a) to provide a device that sounds an alarm when the animal wearing the device starts to urinate;

b) to prevent any damage from the discharge by absorbing the urine in an absorbent sensing pad;

c) to provide a device that is comfortable for the animal;

d) to provide a device that is easy to attach and remove from the animal;

e) to provide a device that is easy to maintain.

Further objects and advantages are to provide an absorbent urine detector that is reliable, durable, and inexpensive to manufacture. Still further objects and advantages will become apparent from a consideration of the ensuing description and drawings.

DRAWING FIGURES

These and other objectives of the present invention will be better understood from the description that follows by referencing the accompanying drawings, in which:

FIG. 9 and 10 represent enlarged and opposite perspective of the saddle assembly of the devices in FIGS. 1 and 7;

FIG. 11 is a cross-sectional view of the belt along lines 11—11 of FIG. 10;

Figure 1:
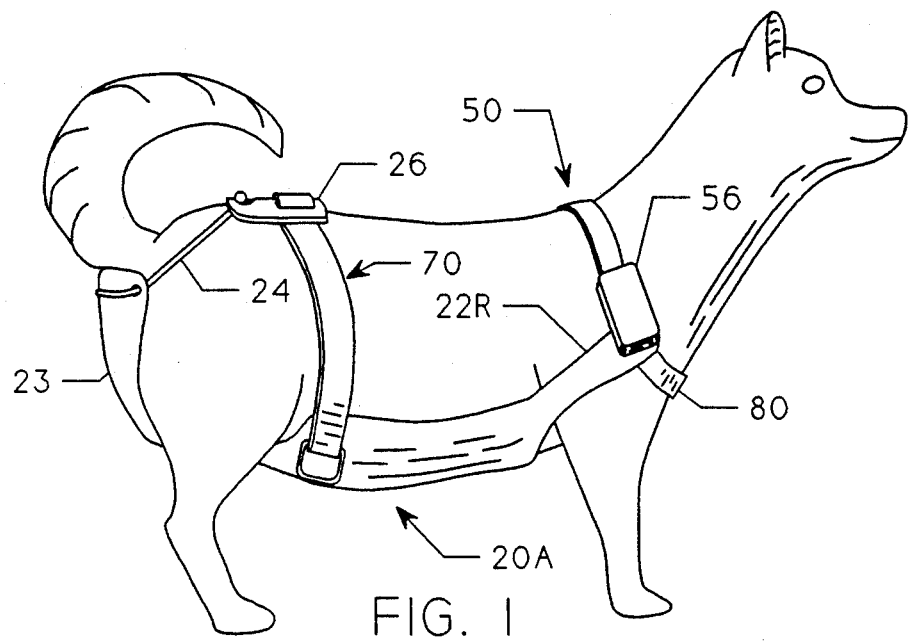
FIG. 1 is a perspective view of an animal fitted with one embodiment of the absorbent urine detector suitable for training a male or female animal.

REFERENCE NUMERALS IN DRAWINGS 20A first panel assembly
20B second panel assembly
21 body panel
22L first forward extension
22R second forward extension
23 rear elongated extension
24 support cord
25A first eyelet
25B second eyelet
26 back strap clasp
27 inner fabric panel
28 outer fabric panel
29 container loop fastening pad
30 back strap loop fastening strip
31 absorbent sensing panel assembly
32A first absorbent pad
32B second absorbent pad
33 first sensing electrode
34 second sensing electrode
35 hidden seam
36 electrode seam
37 peripheral seam
38 exposed seam
40A first extension rivet
40B second extension rivet
41 first female snap fastener
42 first male snap fastener
43 fastener support plate
44A first copper foil pad
44B second copper foil pad
45A first electrode opening
45B second electrode opening
46 electrode adhesive
50 saddle assembly
51 belt
52A upper strap
52B lower strap 53 power conductor pair
54 belt stitch
55 first container
56 second container
57 container hook pad
58 second male snap fastener
59 second female snap fastener
60 power switch
61 audio port
62 belt rivet
65 moisture sensor circuit
66 timer
67 audio signal generator
68 audio output transducer
70 back strap assembly
71 back strap band
72 ring
73A first back strap hook pad
73B second back strap hook pad
80 front strap
81 first front band
82 second front band

DETAILED DESCRIPTION OF PREFERRED EMBODIMENTS—FIGS. 1 TO 12

FIG. 1 illustrates an embodiment of the absorbent urine detector for training animals suitable for use by a female or a male animal, such as a dog. A first panel assembly 20A is supported close to the ventral side of an animal by a back strap assembly 70 and a saddle assembly 50. A front strap 80 passes under the dewlap and across the front of the upper arms of the animal. When wearing assembly 20A, a rear elongated extension 23 passes between the back legs of the animal to cover the entire inguinal region of the animal.

Figure 2:
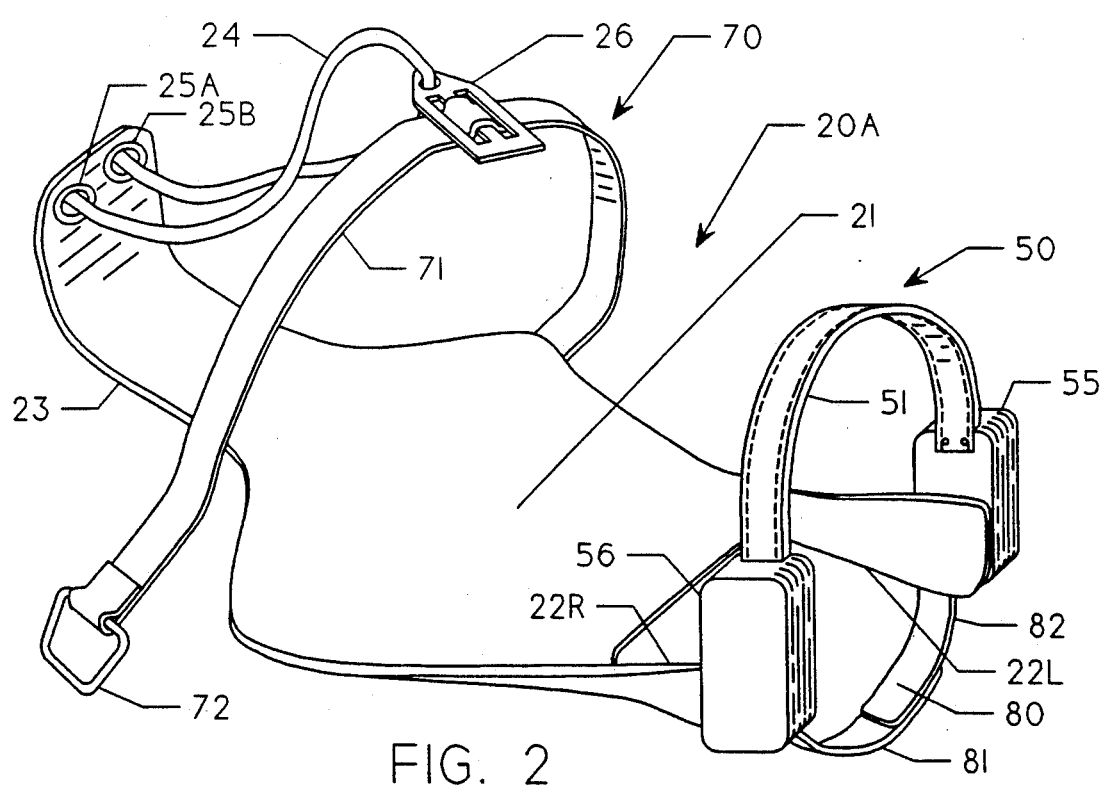
FIG. 2 is an enlarged perspective of the detector shown in FIG. 1.

Referring to FIG. 2, panel assembly 20A includes a body panel 21 that is integral with rear elongated extension 23. The dimensions of assembly 20A allow body panel 21 to cover the ventral side of an animal between the front legs and back legs. A first forward extension 22L extends from and is integral with a forward corner of panel 21 corresponding to the left side of the animal when assembly 20A is in worn by that animal. A second forward extension 22R extends from and is integral with the forward corner of panel 21 corresponding to the right side of the animal when assembly 20A is worn by that animal. The length of extensions, 22L and 22R, allow them to pass over the upper arms of the animal.

Figure 3:
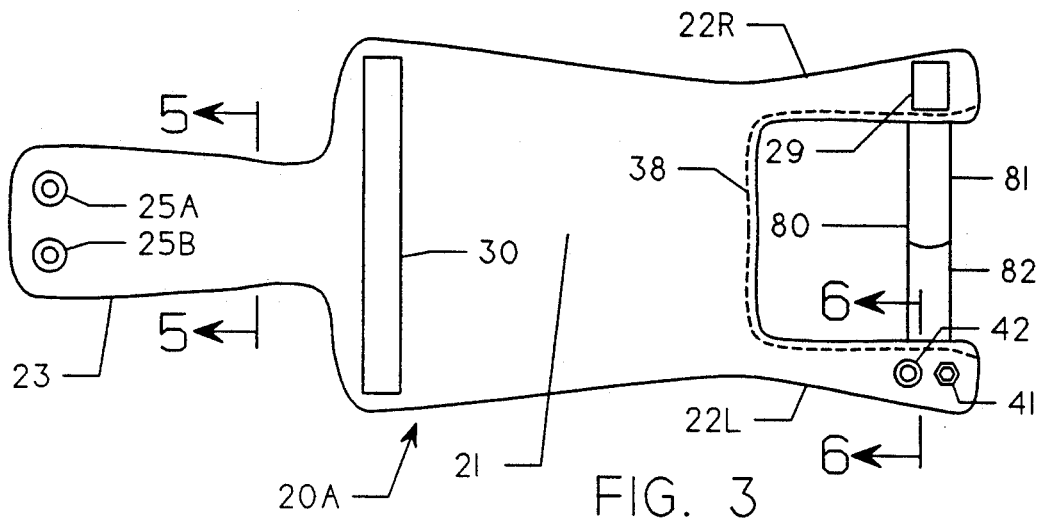
FIG. 3 is a bottom view of the detector of FIG. 1.
Figure 4:
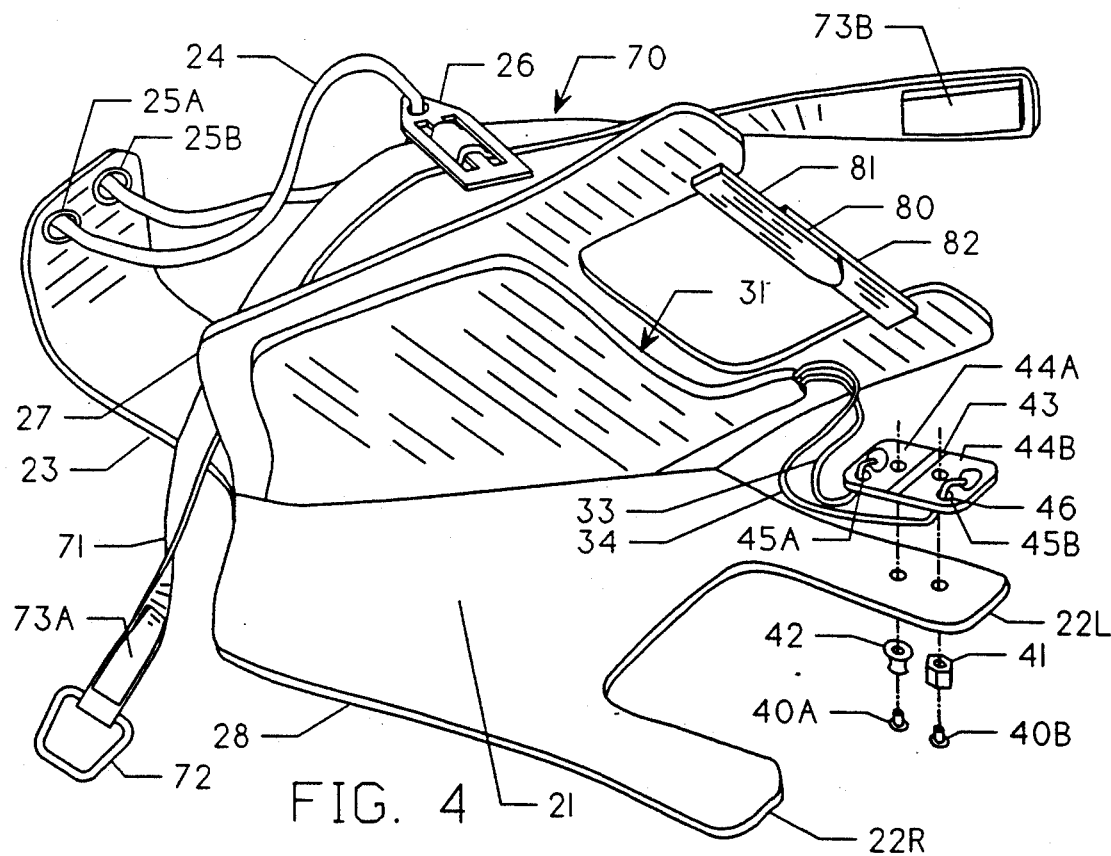
FIG. 4 is a perspective of a partially assembled absorbent urine detector illustrated in FIG. 1 showing internal assembly details.
Figure 5:
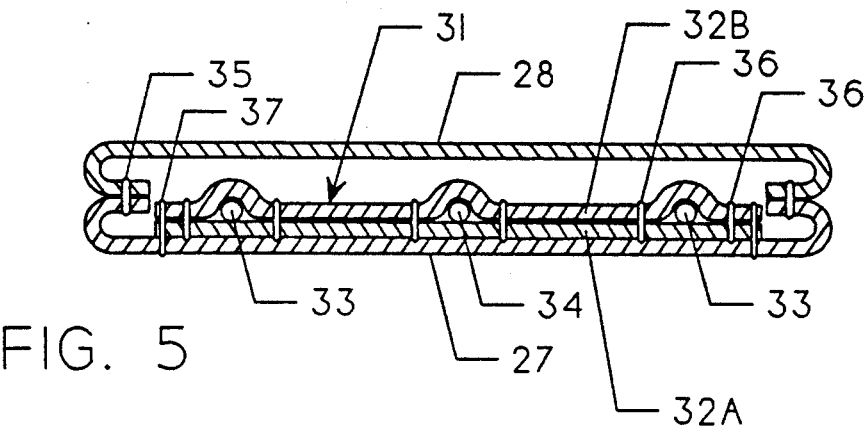
FIG. 5 is a cross-sectional view along lines 5—5 of FIG. 3 showing construction details of the absorbent sensing panel assembly.

FIGS. 3 and 4 illustrate the construction details of first panel assembly 20A. An outer fabric panel 28 is a durable denim material. An inner fabric panel 27 is a light soft cotton fabric that is durable but allows moisture to pass easily. However, fabric used for panel 27 and panel 28 can consist of any material that is washable and has a shrink coefficient that is about the same to prevent the assembly from being distorted from washing. As illustrated in FIG. 5, both panel 27 and panel 28 are the same shape and size, allowing for a hidden seam 35. Referring to FIG. 3, a bottom view of assembly 20A shows the outside surface of panel 28. To this surface a back strap loop fastening strip 30 is secured by sewing. Strip 30 extends from the left side to the right side of panel 28 in a position just forward the back legs when the device is worn by an animal. A container loop fastening pad 29, secured by sewing, is located on the outside surface of second forward extension 22R. In practice, fastening strip 30 and fastening pad 29 are a loop fastening material sold under the trademark Velcro.

Referring to FIGS. 4 and 5, an absorbent sensing panel assembly 31 lies between panel 27 and panel 28. Forming sensing panel assembly 31 is a pair of terry cloth fabric pads; a first absorbent pad 32A and a second absorbent pad 32B. The general shape or geometry of assembly 31 complements panel 21 and extension 23 and is undersized to fit between panel 27 and 28 without interfering with hidden seam 35. A first sensing electrode 33 and a second sensing electrode 34 located between pad 32A and pad 32B, follow separate but parallel convoluted paths. Electrode 33 and electrode 34 are held in place by an electrode seam 36 that is parallel to and on either side of each electrode. To be effective, electrode 33 must be separated by at least one centimeter, but not more than two centimeters, from electrode 34. For durability, a flexible magnet wire such as New England Electric Wire Corporation Tinsel T-3246 is used for electrodes 33 and 34. A separate "figure of eight" knot is made at the very end of each electrode that terminates in assembly 31. Securing these knots into panel assembly 31 by sewing each of them into separate electrode seams 36, prevents these electrodes from moving. Electrodes 33 and 34 exit assembly 31 with sufficient length to reach the end of forward extension 22L. A peripheral seam 37 secures panel assembly 31 to inner fabric panel 27.

Referring to FIG. 4, electrodes 33 and 34 extend from panel assembly 31 to a fastener support plate 43 near the end of forward extension 22L. Support plate 43 is made of an epoxy type circuit board material with a first copper foil pad 44A and a second copper foil pad 44B. Foil pad 44A is electrically separated from foil pad 44B. Electrode 33, passing through a first electrode opening 45A, is secured by soldering to first foil pad 44A. Electrode 34, passing through a second electrode opening 45B, is secured by soldering to second foil pad 44B. Applying an electrode adhesive 46 to openings 45A and 45B, provides strain relief to the solder joints. A fast acting epoxy is suitable for adhesive 46. A first extension rivet 40A passing through a first male snap fastener 42, outer fabric panel 28 of forward extension 22L and first foil pad 44A, mechanically and electrically secure fastener 42 to the support plate 43. A second extension rivet 40B passing through a first female snap fastener 41, outer fabric panel 28 of forward extension 22L and second foil pad 44B, mechanically and electrically secure fastener 41 to the support plate 43. Rivets 40A and 40B mechanically fasten snap fasteners 42 and 41 to forward extension 22L. The distance separating snap fastener 42 and 41 is determined by the dimensions of saddle assembly 50, which will be explained later.

Referring to FIG. 4, back strap assembly 70 has a back strap band 71 of sufficient length to reach about the torso of the animal. Preferably, band 71 is made of an elastic fabric that is capable of stretching without causing discomfort to the animal. A ring 72 is attached to one end of band 71 by passing a short length of the band through ring 72 and folding whereby a loop forms capturing ring 72. Sewing the folded length of band 71 secures ring 72. A short distance from the end of band 71 with attached ring 72 a first back strap hook pad 73A is fastened by sewing to one side of the band. On the same side of band 71 that pad 73A is fastened to, but on the end opposite ring 72, a second back strap hook pad 73B is fastened by sewing. A hook fastening material, such as sold under the trademark Velcro, is used for pads 73A and 73B. In use, pads 73A and 73B of the back strap assembly 70 cooperatively engage back strap loop fastening strip 30.

Referring to FIGS. 3 and 4, a first eyelet 25A and a second eyelet 25B extend through rear extension 23 close to the most rearward end of the extension. In use, a support cord 24 passes through eyelets 25A and 25B and attaches to a back strap clasp 26. Clasp 26 is an elongated plate, such as leather, with two parallel slots that allow band 71 to pass. Clasp 26 is frictionally secured to band 71 whereby movement along the length of the band is resisted. Cord 24 passes through a separate opening in clasp 26.

Figure 6:
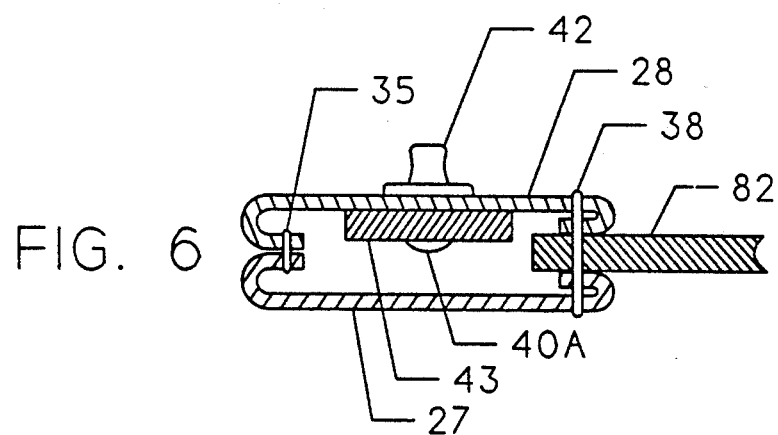
FIG. 6 is a cross-sectional view along lines 6—6 of FIG. 3 showing construction details of the panel assemblies.

Front strap 80 is adjustable in length to allow for various animal shapes and sizes. Strap 80 has two separable bands; a first front band 81 and a second front band 82. These bands are essentially hook and loop fabric bands, such as sold under the trademark Velcro. First front band 81 is a length of loop fabric sewn into an exposed seam 38 of forward extension 22R as illustrated in FIG. 3. Referring to FIGS. 3 and 6, second front band 82 is a length of hook fabric sewn into exposed seam 38 of forward extension 22L. In the construction of assembly 20A and 20B, exposed seam 38 is the last seam made.

As illustrated in FIGS. 9 and 10, the saddle assembly 50 has a first container 55 and a second container 56 fastened to either end of a belt 51. These two containers, 55 and 56, are typically essentially rectangular cases of approximately the same size and weight. The preferred construction material for containers 55 and 56 is high impact plastic such as sold under the trademark Zytel. Zytel is a trademark of E. I. DuPont de Nemours & Co., Wilmington, Del. To make this device as comfortable as possible for the animal, saddle assembly 50 must be as light in weight as the art allows. To prevent sagging to one side of the animal, containers 55 and 56 must be approximately equal in weight.

First container 55 encloses the moisture sensing electronic circuitry as explained below. Referring to FIG. 9, rivets secure a second male snap fastener 58 and a second female snap fastener 59 to the lower side surface of first container 55 that faces the animal when this device is in use. The rivets that mechanically secure snap fasteners 58 and 59 to container 55 electrically contact the enclosed electronic circuitry. The separation between snap fasteners 58 and 59 must be the same as the snap fasteners 41 and 42, displayed in FIG. 4. With this construction, the snap fasteners 58 and 59 cooperatively engage the snap fasteners 41 and 42 and releasably fasten container 55 to the forward extension 22L. With these fasteners engaged, the electronic circuitry in container 55 monitors the conductivity between sensing electrodes 33 and 34.

Figure 12:
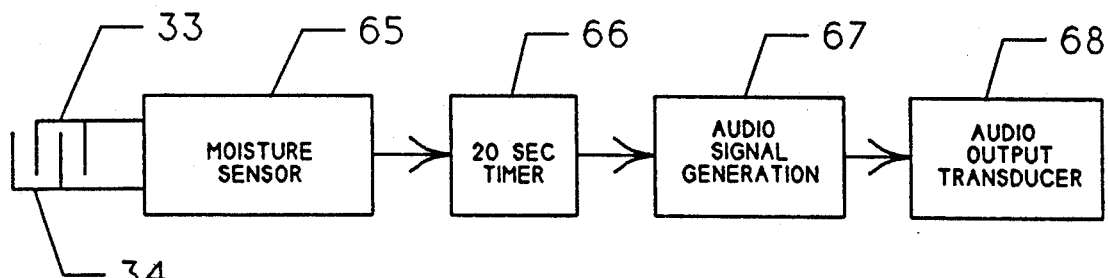
FIG. 12 is a block diagram illustrating the electrical circuitry.

FIG. 12 illustrates a block diagram of electronic circuitry enclosed in container 55. When the conductivity between electrode 33 and electrode 34 drops approximately below 100,000 Ohms, a moisture sensor circuit 65 activates a timer 66. Once activated, timer 66 enables an audio signal generator 67 for 15 to 20 seconds. The output of generator 67 drives an audio output transducer 68. Sensor 65 requires a degree of hysteresis to prevent reactivation of timer 66 if the device is not removed from the animal after activation and absorbent sensing panel assembly 31 begins to dry. Referring to FIG. 10, an audio port 61 provides a passage for sound from transducer 68 to leave container 55. A power switch 60 is accessible on container 55 whereby electrical power may optionally be removed from the electronic circuitry. To achieve low power consumption, complementary metal oxide semiconductor (CMOS) electronic technology is used in the electronic circuitry.

Second container 56 encloses the electric power source for the electronic circuitry enclosed in container 55. The preferred power source is a light weight lithium or carbon battery. A power conductor pair 53, illustrated in a cross section of belt 51 in FIG. 11, electrically connects the battery located in container 56 to the electronic circuitry located in container 55. Belt 51 includes an upper strap 52A, a lower strap 52B, and the conductor pair 53. These straps are sewn at the edges with a belt stitch 54 to form a passage through which the conductor pair 53 pass. The ends of the belt 51 fit into a rabbet on the upper edge each of containers 55 and 56. The ends of the belt assembly are fastened to the containers with a pair of belt rivets 62. Referring to FIG. 10, adhesive secures a container hook pad 57 to the lower side surface of second container 56 that faces the animal when the device is in use. Whereby, hook pad 57 cooperatively engages loop fastening pad 29 located on forward extension 22R.

Figure 7:
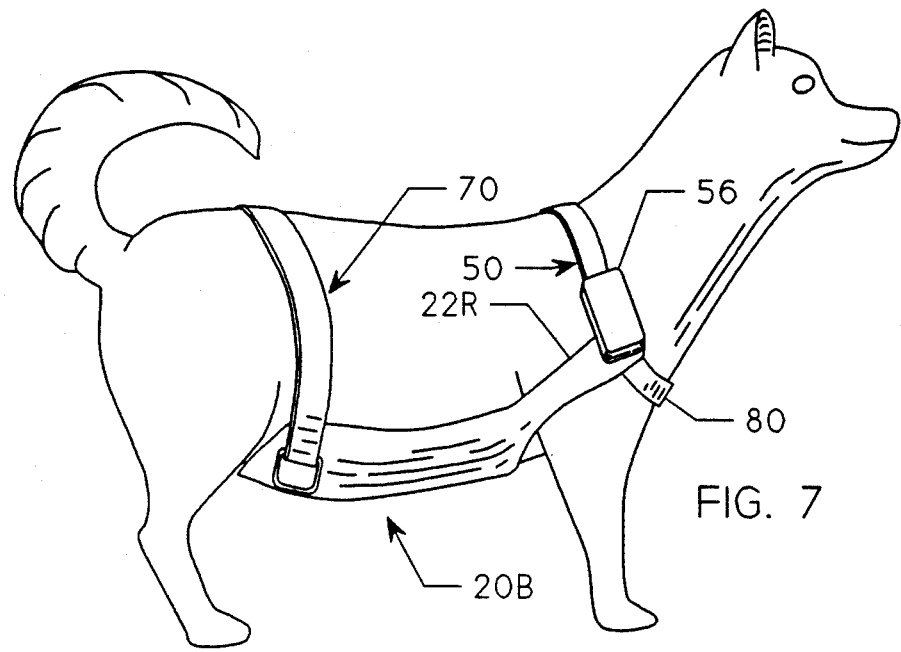
FIG. 7 is a perspective view of an animal fitted with a second embodiment of the present invention suitable for training male animals.
Figure 8:
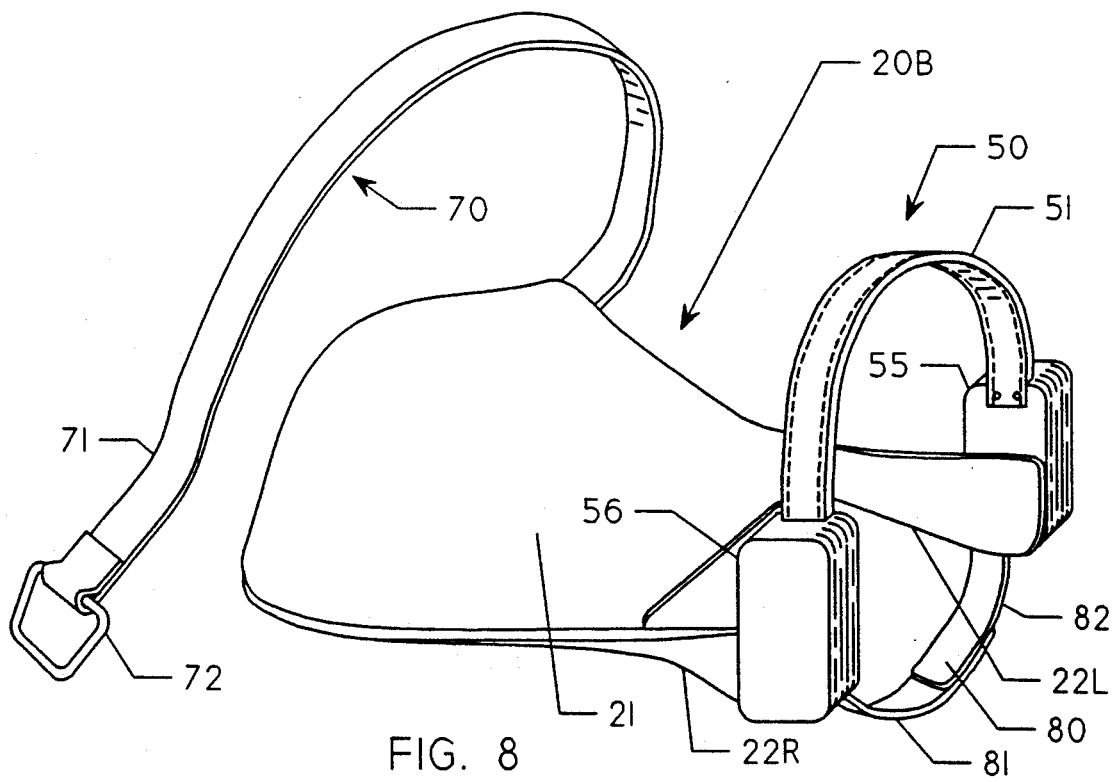
FIG. 8 is an enlarged perspective of the absorbent urine detector illustrated in FIG. 7.

FIG. 7 illustrates a second embodiment of the absorbent urine detector suitable for training a male animal. FIG. 8 illustrates an enlarged perspective view of the device in FIG. 7. A second panel assembly 20B, supported close to the ventral side of an animal by back strap assembly 70 and saddle assembly 50, collects urine discharged from the animal. Both assembly 20A and assembly 20B use the same saddle assembly 50, back strap assembly 70, and front strap 80. Because of the similarities between the embodiments of FIG. 1 and FIG. 7, corresponding elements are labeled with corresponding numbers. Thus, this embodiment of assembly 20B is easily understood by referring to the prior discussion of assembly 20A.

Referring to FIGS. 2 and 8, assembly 20B does not include elongated extension 23, support cord 24, or back strap clasp 26. Except for these missing elements, construction of assembly 20B and 20A is basically the same. The dimensions of assembly 20B allow body panel 21 to cover the ventral side of an animal between the front legs and back legs. The rear edge of panel 21, located just forward the back legs when the device is in use by an animal, arches toward the back legs. This construction allows panel 21 some extension between the back legs of the animal. Like assembly 20A, assembly 20B has forward extension 22L and forward extension 22R.

Operation—FIGS. 1 through 10

FIG. 1 illustrates an animal fitted with one embodiment of this device suited for use by male or female animals. The device is specifically designed for the safety and comfort of the animal while preventing urine damage to furniture and carpeting during the period the animal is being trained to urinate in an acceptable area. Unlike prior art, an alarm in this device sounds almost immediately upon the commencement of urination. This alarm enhances the effectiveness of the device in training an animal. Incorporated into this device are reliability, ease of use, and ease of maintenance.

Referring to FIG. 2, placing the device on the animal requires disengaging second container 56 from forward extension 22R. First container 55 remains engaged to forward extension 22L. After passing the animals front legs through an opening formed by forward extensions 22R and 22L, body panel 21, and front strap 80, place saddle assembly 50 over the animals withers. Hook pad 57 on second container 56 engages loop fastening pad 29 secured to forward extension 22R. Initially, the length of front strap 80 must be adjusted. Disengage first front band 81 from second front band 82 and engaged at the proper length. When front strap 80 is properly adjusted, saddle assembly 50 and front strap 80 form a loose comfortable fitting collar that support the forward end of the device beneath the animal.

Back strap assembly 70 passes around the torso of the animal and supports body panel 21 close to the ventral side of the animal. First back strap hook pad 73A and second back strap hook pad 73B engage loop fastening strip 30. Back strap loop fastening strip 30 that laterally traverses body panel 21, has sufficient length to permit adjustment whereby the device can be fitted to animals of various sizes and shapes. The elastic nature of assembly 70 provides for a snug yet comfortable fit of assembly 20A to the animal.

After back strap assembly 70 is in place and secured, rear elongated extension 23 is passed between the back legs of the animal. This extension, supported by cord 24, covers the inguinal region of the animal. Cord 24 passes through the opening located in clasp 26 that is centered on the animals back just forward the tail. A first end of cord 24 passes through first eyelet 25A and the second end of cord 24 passes through eyelet 25B. After passing through the eyelets, the two ends of cord 24 are fastened with a knot. In this configuration, the cord forms a loop through which the tail of the animal passes. This simple construction allows fitting rear elongated extension 23 to animals of various sizes and shapes.

Referring to FIG. 10, with power switch 60 activated, mounting of first panel assembly 20A is completed. If the animal wearing this device now urinates, the audio alarm in electronics container 55 sounds. In many cases, the sound of the alarm will sufficiently frighten the animal to prevent completion of the discharge. After removing the device, the animal is taken to an area where it may safely discharge. This device prevents damage from the animal's discharge and, unlike prior art, facilitates change in the behavior of the animal.

FIG. 7 illustrates a second embodiment of this invention suitable for use with male animals. Second panel assembly 20B is more comfortable for a male animal because no rear elongated extension passes between the animal's back legs. Initially, the procedure for mounting second panel assembly 20B is essentially the same as first panel assembly 20A previously explained. The procedure for placing saddle assembly 50 on the animal and adjusting front strap 80 is exactly the same for assembly 20A or 20B. After adjusting back strap assembly 70 to provide a snug fit of assembly 20B to the ventral side of the animal, mounting assembly 20B is complete. Front strap 80 prevents assembly 20B from moving in the posterior direction. The front legs of the animal prevent the assembly from moving in the anterior direction. Forward extensions 22L and 22R prevent rotative movement of assembly 20B from the ventral side of the animal. As a result, assembly 20B is securely retained on the animal while still allowing free movement and comfort of the animal.

The same procedure is used to remove assembly 20A or 20B from an animal. First, disengaging the end of back strap assembly 70 with ring 72 from panel 21 frees that end of the device from the animal. Ring 72 helps remove strap assembly 70 without pulling on the animal's fur. When removing assembly 20A, there is no need to release cord 24 from rear elongated extension 23 or clasp 26. To complete removal of either device, pull second container 56 from fastening pad 29. There is never a need to release front strap 80 when removing either assembly 20A or 20B.

Assembly 20A and 20B may be cleaned by laundering. To launder either assembly, saddle assembly 50 is first removed by pulling snap fasteners 41 and 42 on forward extension 22L from corresponding snap fasteners 58 and 59 on first container 55. Both assembly 20A and 20B may be laundered with back strap assembly 70 attached. After laundering and drying, saddle assembly 50 is attached to assembly 20A or 20B by cooperatively engaging the snap fasteners 58 and 59 to fasteners 41 and 42. For ease of maintenance, this device can be laundered repeatedly and is, what is commonly known as, machine washable.

Having illustrated and described the principles of my invention with reference to the detailed description set forth above, it should be apparent to those persons skilled in the art that such invention may be modified in arrangement and detail without departing from such principles. I claim as my invention all such modifications as come within the true spirit and scope of the following claims.

I claim:

1. A urine detecting device for training animals adapted to be worn by four legged animals that includes:

a body panel formed of a flexible material, proportioned with respect to the animal to cover the ventral side between the front and hind legs thereof, the panel being approximately rectangular with a front panel end and a rear panel end opposite therefrom, the front end proximal to the front legs of the animal, the front end having a first forward extension projecting therefrom to a first distal end, the front end having a second forward extension projecting therefrom to a second distal end, the first extension spaced apart and approximately parallel to the second extension thereby defining an opening through which the front legs of the animal pass, the first extension and the second extension proportioned with respect to the animal to allow passing upwardly and forwardly over respective upper arms thereof;

a front strap adapted to pass forward the upper arms of the animal proximally the brisket thereof having a first end a second end opposite therefrom, the first end secured to the distal end of said first forward extension, the second end secured to the distal end of said second forward extension;

a back strap adapted to pass about the torso of the animal proximal to the hind legs thereof having a first end and a second end opposite therefrom, a pair of back strap securing means attached to the strap ends and said body panel join the strap ends to the panel;

a belt adapted to pass over the withers of the animal having a first belt end and a second belt end opposite therefrom, the first end including a first fastening means to the distal end of said first forward extension, the second end including a second fastening means to the distal end of said second forward extension whereby said body panel is supported close to the ventral side of the animal;

a first and a second separated sensing electrodes included in said body panel defining a portion of an electrical current path having a conductivity that increases when urine enters that portion of the path between the electrodes, the electrodes electrically connected respectively to a first and a second spaced apart electrically conductive fastener means;

an electric circuit means carried by said belt, including a moisture sensor circuit means, an audio signal generation means, and a battery means, having a third and a fourth electrically conductive fastener means such that when the first and second fastener means contact respective third and fourth fastener means, the presence of urine between said first and second separated sensing electrodes will energize said audio signal generation means.

2. The urine detecting device of claim 1 wherein said flexible material is made of absorbent washable cloth material.

3. The urine detecting device of claim 1 wherein said flexible material is made of absorbent paper material.

4. The urine detecting device of claim 1 wherein said front strap includes a first front band and a second front band, each band having a first end and a second end opposite therefrom, the first end of each band is secured, exclusive of the other band, to the distal end of one of the forward extensions, the front bands having cooperating releasable securing means thereon permitting securing said first front band to said second front band at any point between the bands first and second ends whereby the length of said front strap is easily adjustable.

5. The urine detecting device of claim 1 wherein said back strap is fabricated of an elastic material.

6. The urine detecting device of claim 1 wherein said back strap securing means includes releasable securing means.

7. The urine detecting device of claim 1 wherein the rear end of said body panel includes a rear elongated extension adapted to pass between the hind legs of the animal substantially covering the inguinal region, the elongated extension including a support means secured to said back strap.

8. The urine detecting device of claim 1 wherein the device includes a first container and a second container, having said first belt end secured to said first container and said second belt end secured to said second container, said first container including said moisture sensor circuit means and said audio signal generation means and said third and fourth electrically conductive fastener means, said second container including said battery means, the containers being electrically and operatively interconnected by an electrical conductor means included in said belt, said first container including said first fastening means, said second container including said second fastening means, whereby said belt supports the panel and carries said electric circuit means.

9. The urine detecting device of claim 8 wherein said first and second electrically conductive fastener means comprise respective first and second snap fasteners secured to said first forward extension, said third and fourth electrically conductive fastener means comprise respective third and fourth snap fasteners whereby the first and second fasteners respectively engaging the third and fourth fasteners comprise the electrically conductive fastener means and said first fastening means, whereby said first container is releasably fastened to the first extension.

10. The urine detecting device of claim 8 wherein said second fastening means includes said second container and said second forward extension having a cooperating releasable fastening means thereon, whereby said second container is releasably fastened to the second extension.

11. A urine detecting device for training animals adapted to be worn by four legged animals that includes:

a flexible body panel, proportioned with respect to the animal to cover the ventral side between the front and hind legs thereof substantially covering the area of the genitals, the panel having a front panel end adjacent to the front legs of the animal extending therefrom to a rear panel end, the front end having a first forward extension and a second forward extension, the panel and forward extensions proportioned with respect to the animal to allow each extension to pass over the upper arm proximally thereof, the panel having a first sensing electrode and a second sensing electrode spaced apart therefrom defining a portion of an electrical current path having a conductivity that increases when urine from the animal enters that portion of the path between the electrodes;

a collar means adapted to pass about the shoulders of the animal proximally the withers and upper arms thereof, including a belt and a front strap, said belt passing over the withers of the animal having a first belt end and a second belt end opposite therefrom, a first belt fastening means attached to the first end and said first forward extension, a second belt fastening means attached to the second end and said second forward extension, the fastening means securing respective belt ends to respective forward extensions, said front strap having a first front strap end secured to said first forward extension, extending forward and about the upper front arms of the animal to a second front strap end secured to said second forward extension, whereby said front strap in combination with said belt support the front end of said body panel;

a back strap adapted to pass about the torso of the animal, having a first end and a second end opposite therefrom, a back strap securing means attached to each of the ends and said body panel join the ends to the panel;

an electrical circuit means carried by said collar means including an electrical coupling means to the first and second sensing electrodes, a moisture sensor circuit means and an audio signal generation means, said electrical circuit means adapted to detect and indicate the increase in conductivity between the first and second sensing electrodes.

12. The urine detecting device of claim 11 wherein said body panel includes a rear elongated extension projecting from said rear panel end, proportioned with respect to the animal to pass between the hind legs to a region of the tail thereof, a rear extension support means in combination with said back strap, whereby the extension is held close to the tail.

13. The urine detecting device of claim 11 wherein said back strap securing means includes releasable securing means.

14. The urine detecting device of claim 11 wherein said back strap includes elastic material.

15. The urine detecting device of claim 11 wherein said front strap includes a pair of bands in combination with a length adjustment means.

* * * * *